Oct. 26, 1965 D. L. BEATTY 3,213,882
PNEUMATIC CONTROL VALVE
Filed Feb. 8, 1965 3 Sheets-Sheet 1
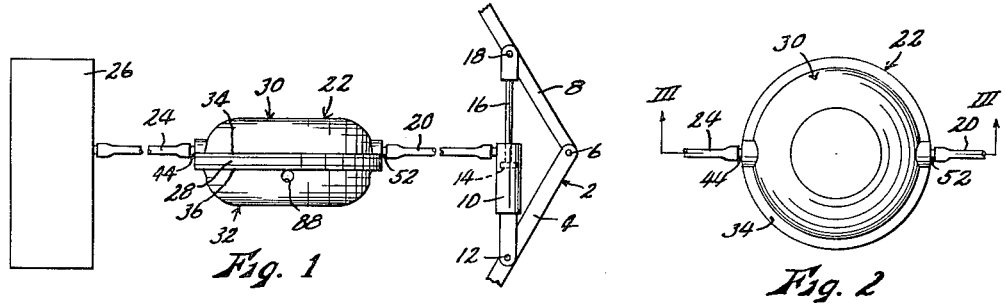
INVENTOR.
David L. Beatty
BY John A. Hamilton
Attorney.

Oct. 26, 1965 D. L. BEATTY 3,213,882
PNEUMATIC CONTROL VALVE
Filed Feb. 8, 1965 3 Sheets-Sheet 2

INVENTOR.
David L. Beatty
BY John A. Hamilton
Attorney.

Oct. 26, 1965

D. L. BEATTY 3,213,882

PNEUMATIC CONTROL VALVE

Filed Feb. 8, 1965

INVENTOR.
David L. Beatty
BY John A. Hamilton
Attorney.

United States Patent Office 3,213,882
Patented Oct. 26, 1965

3,213,882
PNEUMATIC CONTROL VALVE
David L. Beatty, 10712 E. 84th Terrace, Raytown, Mo.
Substituted for abandoned application Ser. No. 294,364,
July 11, 1963. This application Feb. 8, 1965, Ser. No.
446,754
4 Claims. (Cl. 137—596)

This invention relates to new and useful improvements in pneumatic control valves, and has particular reference to a pneumatic control valve of a type especially suited for use by a disabled person in operating an artificial arm, hand or other prosthetic device.

An important object of the present invention is the provision of a control valve of the character described having the external form of a resiliently compressible capsule, with all operations of the valve being controlled by manual pressure exerted on said capsule. This permits operation of the valve by a disabled person with portions of his body not ordinarily capable of performing such complex operations. For example, the capsule may be placed in the armpit of a person having only a small stump of an arm, and operated by pressing it between said stump and the body, whereby to control an artificial arm or hand.

Another important object of the invention is the provision of a pneumatic control valve of the character described which acts as a pressure regulator, so that any desired pressure may be delivered to the controlled prosthetic device, and in which the delivered pressure is generally proportional to the manual pressure exerted on the capsule. The latter feature provides a highly desirable sensitivity or sense of "feeling" in the operation of a prosthetic device, since the power or force with which the device is operated depends on the degree of exertion of the user's own muscles. With this provision, the user soon learns to control the prosthetic device with a high degree of delicacy and accuracy.

Another object is the provision of a control valve of the character described having no joints or connections which must remain fluid-tight and which have relatively sliding or rotating parts where leaks could develop. All fluid control is effected by pinching compressible tubes. This provides a longer, more trouble-free life for the valve.

A further object is the provision of a control valve of the character described which, with minor modification, may be adapted to control a vacuum line rather than positive pressure, or to control either a positive pressure or a vacuum.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a diagrammatic representation of a prosthetic device and the control system therefor, including a side elevational view of a control valve embodying the present invention, not to scale.

FIG. 2 is a top plan view of the control valve shown in FIG. 1,

FIG. 3 is an enlarged sectional view taken on line III—III of FIG. 2,

FIG. 4 is a fragmentary sectional view taken on line IV—IV of FIG. 3,

FIG. 5 is a fragmentary sectional view taken on line V—V of FIG. 3,

FIG. 6 is a fragmentary sectional view taken on line VI—VI of FIG. 3,

FIG. 7 is a fragmentary sectional view taken on line VII—VII of FIG. 3,

Figure 8:
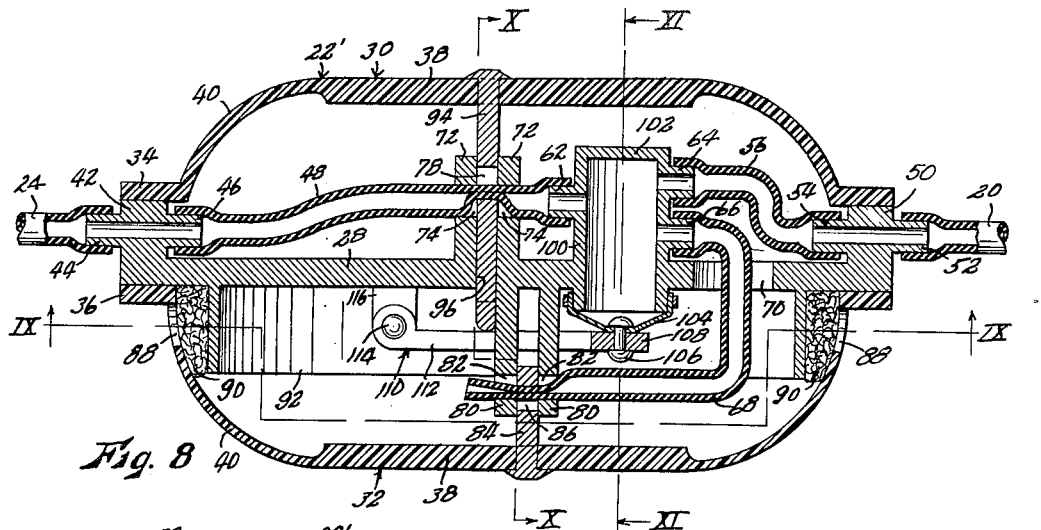
Figure 9:
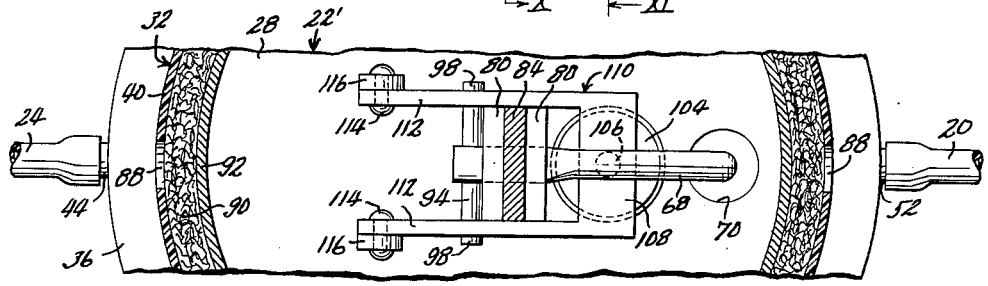
Figure 10:
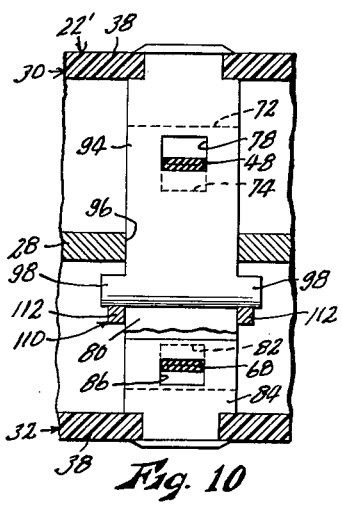
Figure 11:
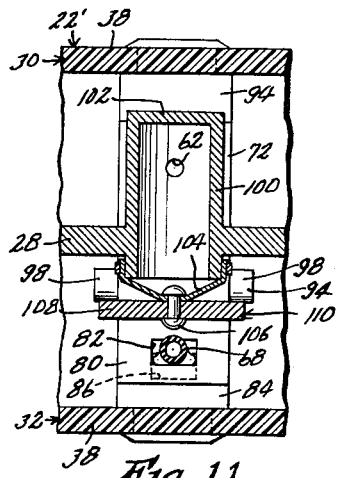
Figure 12:
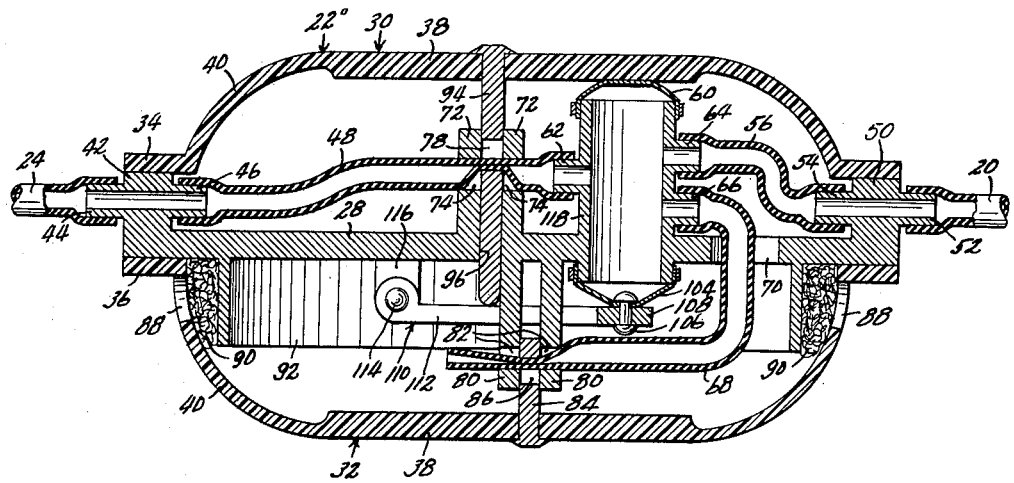

FIG. 8 is a view similar to FIG. 3, but showing a slightly modified form of the valve adapted to control a vacuum line, FIG. 9 is a fragmentary sectional view taken on line IX—IX of FIG. 8, FIG. 10 is a fragmentary sectional view taken on line X—X of FIG. 8, FIG. 11 is a fragmentary sectional view taken on line XI—XI of FIG. 8, and FIG. 12 is a view similar to FIG. 3 showing a further modification of the valve adapted to control either a vacuum or positive pressure.

Like reference numerals apply to similar parts throughout the several views, and in FIG. 1 the numeral 2 applies to a diagrammatic representation of a prosthetic device which consists, for example, of an upper arm member 4 pivoted at 6 to a forearm member 8, said arm members being controllable by a hydraulic ram consisting of a cylinder 10 pivoted at 12 to arm member 4 and having movably carried therein a piston 14 to which is connected a piston rod 16 which is pivoted at 18 to arm member 8. The hydraulic ram is pneumatically operated by air supplied thereto through a flexible tube 20. While FIG. 1 shows tube 20 connected to cylinder 10 in such a manner that positive air pressure is required to contract the hydraulic ram, it will be readily understood that by attaching tube 20 into the opposite end of the cylinder a vacuum would be required to contract the ram. It will be further understood that for various types of prosthetic devices, either pressure or vacuum operation may be desired. Tube 20 is connected through a pneumatic control valve 22 and flexible tube 24 to an air pump 26, which may be either a pressure pump or a vacuum pump, as required. The control valve 22 forms the subject matter of the present invention. FIGS. 1–7 illustrates a control valve 22 operable to control positive air pressure. FIGS. 8–11 illustrate a control valve 22' operable to control a vacuum, and FIG. 12 illustrates a control valve 22" operable to control either positive air pressure or a vacuum.

Referring first to FIGS. 1–7, control valve 22 has the form of a flattened circular capsule, consisting of a flat, circular central wall or plate 28 formed of plastic, metal or other rigid material, and a pair of dish-shaped circular outer walls 30 and 32 disposed respectively at opposite sides of central wall 28, the concave sides of said outer walls facing toward said central wall, and said outer walls being provided respectively about their peripheries with flanges 34 and 36 which are cemented or otherwise suitably secured to the edge portions of central wall 28. Said outer walls are preferably formed of a semi-rigid plastic possessing considerable degree of resilience at least in thin sections. Each of said outer walls has a circular central portion 38 of substantial thickness whereby to be substantially rigid, and a thinner annular portion 40 intermediate said central portion and edge flange 34 or 36 thereof. Said annular portions are sufficiently thin that they are resiliently yieldable, so that the capsule may be resiliently compressed by manual pressure across said outer walls. The annular portion 40 of outer wall 32 is thinner than the corresponding annular portion of outer wall 30, so that wall 32 will yield and move toward central wall 28 before outer wall 30 does so, for a purpose which will presently be described.

Central wall 28 is provided with an integral tubular boss 42 at the side thereof toward outer wall 30, said boss being provided with an outer nipple 44 to which flexible tube 24 from air pump 26 is interconnected, and an inner nipple 46 to which a flexible tube 48 is interconnected, tube 48 being disposed between central wall 28 and outer wall 30. Similarly, central wall 28 is also provided with an integral tubular boss 50 at the side thereof toward outer wall 30, said last named boss being provided with an outer nipple 52 to which tube 20 is interconnected, and an inner nipple 54 to which a flexible tube 56 is interconnected, tube 56 also being disposed between central wall 28 and outer wall 30.

Formed integrally with central wall 28 is a cylindrical pressure chamber 58, the axis of said chamber being at right angles to the plane of wall 28, and extending toward outer wall 30. One end of said chamber is closed by wall 28, and the other end of said chamber, adjacent outer wall 30 is open, having a flexible diaphragm 60 secured thereover. It will be seen that a positive air pressure within chamber 58 will cause diaphragm 60 to be expanded outwardly to engage outer wall 30 to urge said outer wall 30 away from central wall 28. Flexible tube 48 is interconnected to chamber 58 through a nipple 62 of said chamber, and flexible tube 56 is interconnected to said chamber through a nipple 64 thereof. Interconnected to chamber 58 through a third nipple 66 thereof is one end of a flexible tube 68, said last named tube extending through a hole 70 provided therefor in central wall 28, into the space between said central wall and outer wall 32.

Flexible tube 48 is controlled by a valve mechanism comprising a pair of fixed planar valve plates 72 formed integrally with central wall 28 and extending therefrom in parallel, spaced apart relation toward outer wall 30, said plates having matching rectangular holes 74 formed therein, through which tube 48 is threaded. Disposed between plates 72 for sliding movement at right angles to central wall 28 is a movable valve plate 76. The outer end of said movable valve plate is fixed in outer wall 30, and said movable valve plate has a hole 78 through which the portion of tube 48 between plates 72 extends. Outer wall 30 is pretensioned outwardly, whereby tube 48, which may be formed of rubber or other suitably elastic material, is pinched between the opposite walls of holes 74 and 78, as best shown in FIG. 3, whereby to seal the passageway through said tube to prevent the flow of air. However, if outer wall 30 is pressed manually toward central wall 28, hole 78 of movable valve plate 76 is moved more nearly into registry with holes 74 of fixed valve plates 72, allowing tube 48 to expand and open to permit the flow of air therethrough.

Similarly, flexible tube 68 is controlled by a valve mechanism disposed between central wall 28 and outer wall 32, and comprising a pair of fixed valve plates 80 formed integrally with central wall 28 and having matching holes 82 formed therethrough, and a movable valve plate 84 fixed to outer wall 32 and slidable between plates 80 and having a hole 86 formed therethrough, tube 68 being threaded through holes 82 and 86. Outer wall 32 is pretensioned outwardly so that tube 68 is pinched and sealed between opposing walls of holes 82 and 86, as best shown in FIG. 3. However, when wall 32 is pressed manually toward central wall 28, hole 86 of movable valve plate 84 moves into registry with holes 82 of fixed valve plates 80, and tube 68 expands to an open position. If wall 32 is pressed still further toward wall 28, hole 86 again moves out of registry with hole 82, and tube 68 is again pinched and sealed. In other words, movable valve plate 85 has an outer valve-closing position, an inner valve-closing position, and an intermediate valve-opening position.

The free end of tube 68 opens directly into the space between central wall 28 and outer wall 32. Outer wall 32 is provided with a plurality of atmospheric vent openings 88 adjacent the periphery thereof. Said openings are covered at their inner sides by a porous packing material 90, said packing material being confined between wall 32 and a concentric skirt 92 formed integrally with central wall 28.

In use, it will be understood that the control valve is disposed in such a manner that it may be compressed by the disabled user, for example in the armpit so as to be compressed between the body and the stump of an arm. Assuming first that air pump 26 is delivering air under a positive pressure, and that the valve is as shown in FIGS. 1–7, the user compresses the capsule. Since the yieldable annular portion 40 of outer wall 32 is much thinner than the corresponding portion of outer wall 30, wall 32 yields first, sliding valve plate 84 inwardly between plates 80, plate 84 first moving to its intermediate valve-opening position, in which tube 68 is opened and any residual air pressure in cylinder 10 of the prosthetic device is bled off through tubes 20 and 56, pressure chamber 58, tube 68 and vent openings 88 to the atmosphere. Still greater pressure on the capsule moves valve plate 84 to its inner valve-closing position, in which tube 68 is again sealed. As the pressure on the capsule is still further increased, outer wall 30 yields toward central wall 28, sliding valve plate 76 inwardly between plates 72 to open tube 58 as previously described, so that air from pump 26 flows through tubes 24 and 48, pressure chamber 58, and tubes 56 and 20 to the prosthetic device, causing operation thereof.

As pressure builds up at the prosthetic device, it also builds up in pressure chamber 58, causing diaphragm 60 to be expanded outwardly to engage and urge outer wall 30 away from central wall 28, and thus to urge valve plate 76 outwardly to again pinch and seal tube 48. Thus for any given physical pressure exerted by the user in compressing the capsule, a measured air pressure will be supplied to the prosthetic device. Stated in other words, the greater the physical pressure exerted by the user in compressing the capsule, the greater the air pressure delivered to the prosthetic device must be to actuate diaphragm 60 to again close the valve. This constitutes the valve as a "pressure regulator," and is highly desirable in that since the power with which the prosthetic device is operated is generally proportional to the manual pressure exerted by the user, the user soon acquires a sense of "feeling" which is almost natural, and which permits him to operate the prosthetic device with a degree of accuracy and delicacy which would otherwise be impossible. The use of a relatively small pressure chamber 58, rather than utilizing the entire space between walls 28 and 30 as a pressure chamber, which would be possible, provides that a relatively small manual force can control relatively great pressure, so as to render the device suitable for use by persons capable of exerting only slight muscular pressures. The general ratio between the physical pressure and the controlled air pressure can be controlled as desired by varying the area of chamber 58 and diaphragm 60.

Once the desired air pressure exists at the prosthetic device, the user can maintain said pressure either by maintaining his muscular pressure on the capsule, or, if it is desired to retain the prosthetic device at a given pressure for an extended period of time which might be fatiguing to the user by this method, he may simply release all pressure on the capsule. When the capsule is thus released, the full resilient force of outer wall 30 is added to the pressure of diaphragm 60 to cause valve plate 76 to seal tube 48, and valve plate 84 is moved by the resilience of outer wall 32 from its inner to its outer valve-closing position to seal tube 68, thereby trapping the air which is then present between the two valve mechanisms and the prosthetic device. In moving to its outer valve-closing position as just described, valve plate 84 of course moves through its intermediate valve-opening position, but the movement is so rapid that no appreciable loss of pressure occurs during that time. Pressure at the prosthetic device may be relieved at any time simply by exerting only sufficient pressure on the capsule to move valve plate 84 to its intermediate valve-opening position, in which air from cylinder 10 is exhausted through tubes 20 and 56, pressure chamber 58, tube 68 and vent openings 88. Packing material 90 serves to dampen and quiet the hissing noises of air passing through restricted portions of tubes 48 and 68.

FIGS. 8-11 show a modification 22' of the valve adapted to control a vacuum. It is generally identical to the species shown in FIGS. 1-7, corresponding parts being indicated by corresponding numerals, except that provision is made that a vacuum, rather than positive pressure, creates a reactive force tending to close the valve whenever it is opened manually. To this end, FIGS. 8-11 include a movable valve plate 94 similar in all respects to valve plate 76 of FIGS. 1-7 except that it extends slidably through a slot 96 provided therefor in central wall 28, to the side of said wall facing outer wall 32, and is provided at this extended portion with laterally projecting ears 98. Also shown in FIGS. 8-11 is a pressure chamber 100 corresponding in all respects to chamber 58 of FIGS. 1-7 except that the end thereof toward outer wall 30 is sealed as by an integral end wall 102, and except that it extends through central wall 28, being open at the end thereof toward outer wall 32. The open end of said chamber is covered by a flexible diaphragm 104. Said diaphragm is affixed as by a rivet 106 to the cross arm 108 of a U-shaped lever 110. Said lever is generally parallel to central wall 28, and the parallel side arms 112 thereof are pivoted by means of rivets 114 to lugs 116 formed integrally with central wall 28, the axis of said rivets being at right angles to and offset from the longitudinal extent of valve plate 94. Intermediate their ends, side arms 112 of the lever respectively engage the ears 98 of said valve plate.

Thus it will be seen that when the valve shown in FIGS. 8-11 is used in conjunction with an air pump 26 which is a vacuum pump, and with a prosthetic device which is vacuum-operated, the opening of tube 48 by pressing the capsule is accomplished in the same manner as in the FIGS. 1-7 species. This allows air to be drawn from the prosthetic device through tubes 20 and 56, pressure chamber 100, and tubes 48 and 24, thus applying a vacuum to the prosthetic device to operate it. The vacuum which is concurrently formed in chamber 100 draws diaphragm 104 inwardly, whereby lever 110 is pivoted and urges valve plate 94 toward outer wall 32, whereby to again close tube 48. The "regulatory" feature is present in this species also, since the greater the manual pressure exerted on the capsule to open the valve, the greater the vacuum which will be required in chamber 100 to again close tube 48. The operation of the "exhaust" valve plate 84 is identical to that shown in FIGS. 1-7, except of course that the direction of air flow is reversed. In FIGS. 8-11, the various flexible tubes used must of course be of sufficient strength to resist being collapsed by the maximum vacuum capable of being applied by pump 26, and to permit resilient opening thereof at the valves even when said maximum vacuum is applied.

FIG. 12 shows a valve 22" capable of controlling either positive air pressure or a vacuum. In this species, the pressure chamber 118, corresponding to chamber 58 of FIGS. 1-7 and chamber 100 of FIGS. 8-11, extends on both sides of central wall 28 and is open at both ends. The end thereof toward outer wall 30 is provided with a flexible diaphragm 60 which functions in all respects as diaphragm 60 of FIGS. 1-7. The end of the chamber toward outer wall 32 is provided with a flexible diaphragm 104 which is identical in form and function to that shown in FIGS. 8 and 11, operating a lever 110 and valve plate 94 exactly as shown in FIGS. 8-11. When the FIG. 12 valve is connected to a positive pressure pump 26 and tube 48 opened, the resulting positive pressure in chamber 118 expands both of diaphragms 60 and 104. Expansion of diaphragm 104 forces lever 110 out of engagement with valve plate 94, and said diaphragm is thereby rendered inoperative. However, expansion of diaphragm 60 causes it is to engage outer wall 30, and the overall operation of the valve is in all respects identical to that shown in FIGS. 1-7. When the FIG. 12 valve is connected to an air pump 26 which is a vacuum pump, a vacuum is formed in chamber 118, and both of diaphragms 60 and 104 are retracted inwardly. Retraction of diaphragm 60 withdraws it from contact with wall 30 and hence renders it inoperative, but diaphragm 104 then becomes operative and the overall operation of the valve is in all respects identical to that shown in FIGS. 8-11.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A pneumatic control valve comprising:
   (a) a body member having the form of a capsule including a pair of opposed, generally parallel spaced apart walls at least one of which is formed of resilient material whereby to be deflectable toward the other of said walls by manual pressure applied across the distal sides of said walls, and having an inlet and an outlet for air,
   (b) a conduit interconnecting said inlet and said outlet internally of said capsule,
   (c) a valve carried in said capsule and controlling the passage of air through said conduit,
   (d) valve operating members carried by said walls and being operable by separation of said walls to close said valve and operable by movement of said walls toward each other to open said valve, said walls being resiliently biased normally to close said valve,
   (e) a pressure chamber disposed in said capsule and interconnected in said conduit intermediate said valve and said outlet, and
   (f) operating means movably associated with said pressure chamber and movable responsively to pressure changes in said chamber resulting from the opening of said valve to urge said walls apart to close said valve.

2. A pneumatic control valve as recited in claim 1 wherein one of said capsule walls is rigid and the other of said walls is resiliently yieldable, and with the addition of:
   (a) a second resiliently yieldable wall disposed at the side of said rigid wall opposite from said first resilient wall, and being deflectable toward said rigid wall, the relative strengths of said two resilient walls being such that said second resilient wall yields more easily toward said rigid wall than said first resilient wall, when manual pressure is applied across the distal sides of said two resilient walls,
   (b) a second conduit disposed internally of said capsule and venting said outlet to the atmosphere,
   (c) a second valve controlling the flow of air through said second conduit, and
   (d) valve operating members carried respectively by said rigid wall and said second resilient wall, being operable by separation of said rigid wall and said second resilient wall to close said second valve, said rigid wall and second resilient wall being resiliently biased normally to close said second valve, and being operable by movement of said second resilient wall toward said rigid wall to first open and then again close said second valve.

3. A pneumatic control valve as recited in claim 1 wherein said operating means associated with said pressure chamber is operable to close said valve responsively to an increase in positive pressure in said pressure chamber, and is rendered inoperative to affect the separation of said capsule walls in response to the formation of a vacuum in said pressure chamber, and with the addition of:

(a) a second operating means movably associated with said pressure chamber and movable in response to the formation of a vacuum in said pressure chamber to urge said walls apart to cause closure of said valve, and is rendered inoperative to affect separation of said capsule walls by the presence of a positive pressure in said pressure chamber.

4. A pneumatic control valve as recited in claim 2 wherein said pressure chamber is fixedly related to said rigid wall and has a pair of openings formed therein, and wherein said operating means associated with said pressure chamber includes a resilient diaphragm, sealing one of said openings, and means operable by extension of said diaphragm responsively to a positive air pressure in said chamber to urge said first resilient wall away from said rigid wall to close said first valve, said last named means being inoperative to affect the spacing between said rigid wall and said first resilient wall if said diaphragm is retracted responsively to a vacuum in said pressure chamber, and with the addition of:

(a) a second operating means including a second flexible diaphragm sealing the other of the openings of said pressure chamber, and
(b) means operable by retraction of said second diaphragm responsively to the formation of a vacuum in said pressure chamber to urge said first resilient wall away from said rigid wall to close said first valve, said last named means being inoperative to affect the spacing between said first resilient wall and said rigid wall if said second diaphragm is extended responsively to a positive air pressure in said chamber.

References Cited by the Examiner
UNITED STATES PATENTS

| | | | |
|---|---|---|---|
| 3,016,915 | 1/62 | Moeller | 137—595 |
| 3,018,793 | 1/62 | Aagaard | 137—595 |

FOREIGN PATENTS

| | | |
|---|---|---|
| 828,291 | 1/52 | Germany. |

M. CARY NELSON, *Primary Examiner.*